(12) United States Patent
    Tseng (10) Patent No.: US 12,111,501 B2
(45) Date of Patent: Oct. 8, 2024

(54) DUST-PROOF DEVICE AND OPTICAL CONNECTOR MODULE THEREOF

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 0 days.

(21) Appl. No.: 17/346,249

(22) Filed: Jun. 13, 2021

(65) Prior Publication Data

US 2022/0011521 A1  Jan. 13, 2022

Related U.S. Application Data

(60) Provisional application No. 63/048,671, filed on Jul. 7, 2020.

(51) Int. Cl.
    *G02B 6/38* (2006.01)
(52) U.S. Cl.
    CPC ................... *G02B 6/3849* (2013.01)
(58) Field of Classification Search
    CPC .................................................. G02B 6/3849
    See application file for complete search history.

(56) References Cited

U.S. PATENT DOCUMENTS

| | | | | |
|---|---|---|---|---|
| 7,283,718 B2* | 10/2007 | Zaina | ............... | G02B 6/3849 385/139 |
| 8,579,518 B2* | 11/2013 | Isenhour | ............... | G02B 6/3825 385/55 |
| 9,864,156 B1* | 1/2018 | Menguy | ............... | G02B 6/4471 |
| 10,845,547 B2* | 11/2020 | Gadmer | ............... | G02B 6/381 |
| 11,029,470 B2* | 6/2021 | Wong | ............... | G02B 6/406 |
| 11,209,601 B2* | 12/2021 | Liu | ............... | G02B 6/3809 |
| 11,860,426 B2* | 1/2024 | Higley | ............... | G02B 6/3825 |
| 2004/0251220 A1* | 12/2004 | Mertesdorf | ............... | H04Q 1/021 312/223.2 |
| 2020/0183097 A1* | 6/2020 | Chang | ............... | G02B 6/3831 |
| 2022/0011521 A1* | 1/2022 | Tseng | ............... | G02B 6/3849 |

\* cited by examiner

*Primary Examiner* — Rhonda S Peace (57) ABSTRACT

The present invention provides a dust-proof device for protecting insertion interfaces arranged in the optical receptacle. The dust-proof device comprises a coupling portion and a flexible arm connected to the coupling portion, wherein the flexible arm may swing or scroll at a location where the coupling portion is connected to the flexible arm. Alternatively, in another embodiment, the present invention further provides an optical receptacle having a plurality of coupling structures respectively having a first insertion interface at a first side and a second insertion interface at a second side, each first insertion interface or second insertion interface may couple to the dust-proof device so as to form an optical connector module for preventing the optical receptacle from being contaminated.

21 Claims, 8 Drawing Sheets

DUST-PROOF DEVICE AND OPTICAL CONNECTOR MODULE THEREOF

CROSS-REFERENCE TO RELATED APPLICATION

This application claims the benefit under 35 U.S.C. § 119(e) to the U.S. provisional patent application having the Ser. No. 63/048,671 filed on Jul. 7, 2020, the entirety of which is incorporated herein by reference.

FIELD OF INVENTION

The present invention relates to a dust-proof device. In particular, it relates to a dust-proof device and optical connector module thereof used on high-density arrangement for preventing pollution and convenient disassembly without mutual influence.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100 G optical module communication is not enough, and the future will be expected to move towards the era of 400 G optical module communications.

In the field of 400 G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

Figure 1:
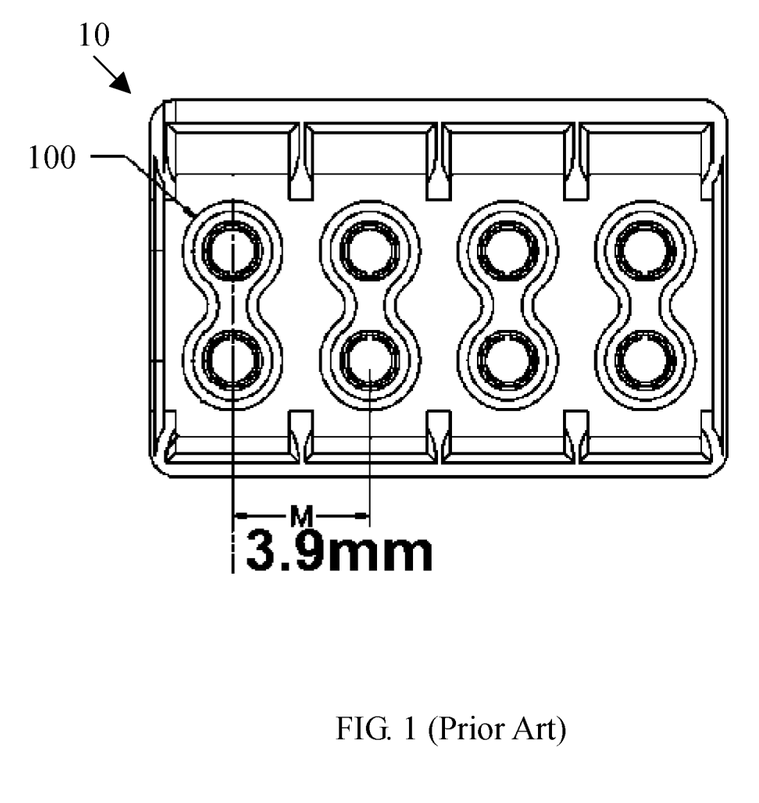
FIG. 1 is a schematic diagram of a conventional optical receptacle with a plurality of coupling bases.

In order to increase the high-density arrangement of the optical connector, the conventional optical receptacle is shown in FIG. 1. The optical receptacle 10 has a plurality of coupling base 100 that are coupled to the optical connector. In order to increase the number of optical connectors that can be accommodated in a predetermined volume, the space between adjacent coupling portions in the optical receptacle 100 shown in FIG. 1 is about 3.9 mm to achieve the condition of high-density arrangement. When the optical connector is not inserted into the optical receptacle, in order to avoid contamination of the coupling portion, a dust-proof device would be inserted into the coupling portion 100.

However, under such high-density arrangement conditions, due to the limited operation space, when the dust-proof device needs to be pulled out, the operation is quite inconvenient. Especially for the dust-proof device installed in the middle area, the user usually takes a lot of effort to remove the dust-proof device, which causes inconvenience in use.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a dust-proof device and an optical connector module thereof, wherein the optical connector has a flexible and swingable handle structure. When the user pulls out the target dust-proof device, the handle structure of the adjacent dust-proof device can be deformed, an operation space is formed for the user to pull out the target dust-proof device. After the target dust-proof device is pulled out, the adjacent dust-proof device can be returned to the original position by the flexible restoring force accumulated during the deformation, and the effect of solving the shortcomings of conventional technology is achieved.

In one embodiment of the present invention, the present invention provides a dust-proof device, for protecting an insertion interface of an optical receptacle, comprising: a coupling portion, a positioning structure disposed on a side of the coupling portion; and a flexible arm, an end of the flexible arm connected to the coupling portion, wherein the flexible arm swings or scrolls at a connecting portion where the coupling portion is connected to the flexible arm.

In another embodiment of the present invention, the present invention provides an optical connector module, comprising: an optical receptacle, having a plurality of coupling bases, a first insertion interface disposed on a first side of the each coupling base, and a second insertion interface disposed on a second side of the each coupling base; and a plurality of dust-proof devices, inserted into the optical receptacle through the first insertion interface or the second insertion interface and coupled to the corresponding coupling base, the each dust-proof device having a coupling portion and a flexible arm, the coupling portion coupled to the coupling base, a positioning structure disposed on a side of the coupling portion, and an end of the flexible arm connected to the coupling portion, wherein the flexible arm swings or scrolls at a connecting portion where the coupling portion is connected to the flexible arm to generate an operation space to the adjacent dust-proof device.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a dust-proof device and optical connector module thereof and to aid it of skilled in the art in practicing this invention. These embodiments are merely exemplary embodiments and in no way to be considered to limit the scope of the invention in any manner.

Figure 2A:
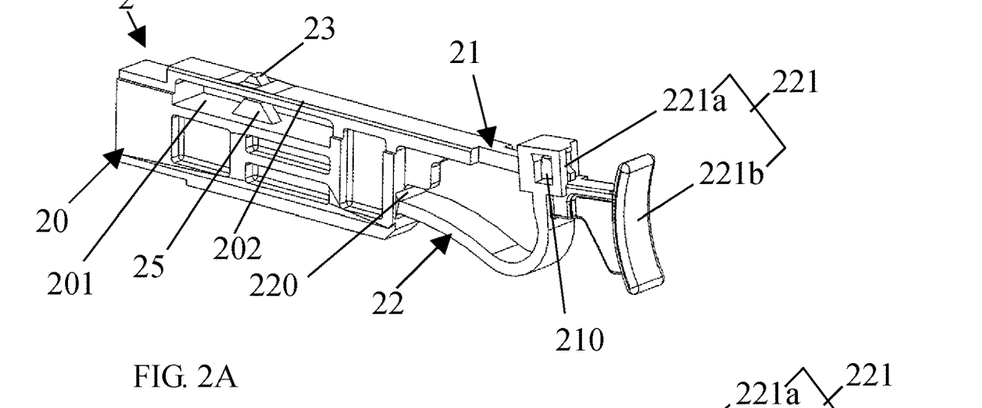
FIG. 2A is a three-dimensional schematic diagram of an embodiment of the dust-proof device in the present invention.
Figure 2B:
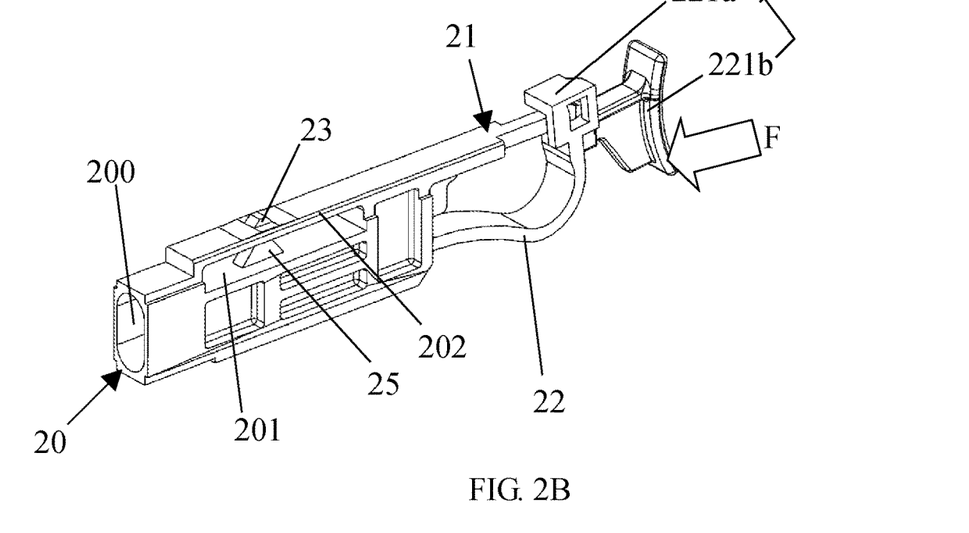
FIG. 2B is another three-dimensional schematic diagram of the optical dustproof device in different visual angle from FIG. 2A.
Figure 2C:
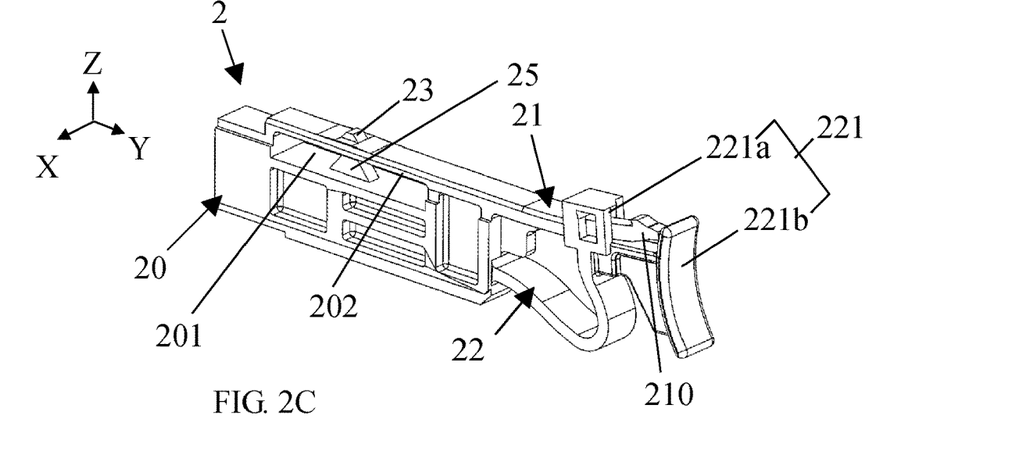
FIG. 2C is a three-dimensional schematic diagram of an embodiment of operating the dust-proof device from FIG. 2A.

Please refer to FIGS. 2A to 2C, in which FIG. 2A is a three-dimensional schematic diagram of an embodiment of the dust-proof device, FIG. 2B is another three-dimensional schematic diagram of the optical dustproof device in different visual angle from FIG. 2A, and FIG. 2C is a three-dimensional schematic diagram of an embodiment of operating the dust-proof device from FIG. 2A. In this embodiment, the dust-proof device 2 has a coupling portion 20 and a flexible arm 22. The coupling portion 20 is used for combining with the coupling base in the optical receptacle, which can prevent the coupling base from being contaminated by contaminants in the optical receptacle, thereby producing an anti-pollution effect. An end of coupling portion 20 of the present embodiment has a notch 200, which allows the coupling base to insert. A fixing arm 21 protrudes from the coupling portion 20. An end of the flexible arm 22 is connected to the coupling portion 20, and another end of the flexible arm 22 is slidably connected to the fixing arm 21, so that the flexible arm 22 may swing or scroll at a connecting portion 220 where the coupling portion 20 is connected to the flexible arm 22.

In this embodiment, the part where the flexible arm 22 and the fixing arm 21 are slidably connected is the sliding portion 221, which further has a sliding sleeve 221a and a pressing plate 221b. The sliding sleeve 221a is slidably disposed on the fixing arm 21, and the pressing plate 221b is connected to the sliding sleeve 221a. As the pressing plate 221b is forced, the sliding sleeve 221a is pushed to slide on the fixing arm 21, thereby changing the position of the pressing plate 221b, and also causing the flexible arm 22 to deform and accumulate the restoring force. In one embodiment, an end of the fixing arm 21 has a stopping structure 210 so that the sliding of the sliding sleeve 221a never separates from the end of the fixing arm 21. The coupling portion 20 has a hollow area 201, a beam structure 202 is disposed above the hollow area 201, and a positioning structure 23 is further formed on the beam structure 202. Since the hollow area 201 is under the beam structure 202, the beam structure 202 can produce a flexible deformation effect under the stress state, and the position of the positioning structure 23 is changed. Its function would be described later.

Next, the operation way of the dust-proof device 2 is described. As shown in FIG. 2B, when a force F is applied to the pressing plate 221b, since the pressing plate 221b is connected to the sliding sleeve 221a, the force F is transmitted to the sliding sleeve 221a, so that the sliding sleeve 221a slides from the stopping structure 210, along the fixing arm 21, toward the coupling portion 20, and to the position shown in FIG. 2C. At the same time, the sliding sleeve 221a causes the flexible arm 22 to scroll. Since the flexible arm 22 has flexibility, when the flexible arm 22 is scrolled to the state shown in FIG. 2C, the flexible arm 22 also accumulates a restoring force at the same time. After the force F disappears, the sliding sleeve 221a is no longer constrained by the force F, the restoring force accumulated by the flexible arm 22 is released, and the sliding sleeve 221a and the pressing plate 221b are rebounded. The rebounded sliding sleeve 221a is blocked by the stopping structure 210 and returns to the position state shown in FIG. 2A.

Figure 3A:
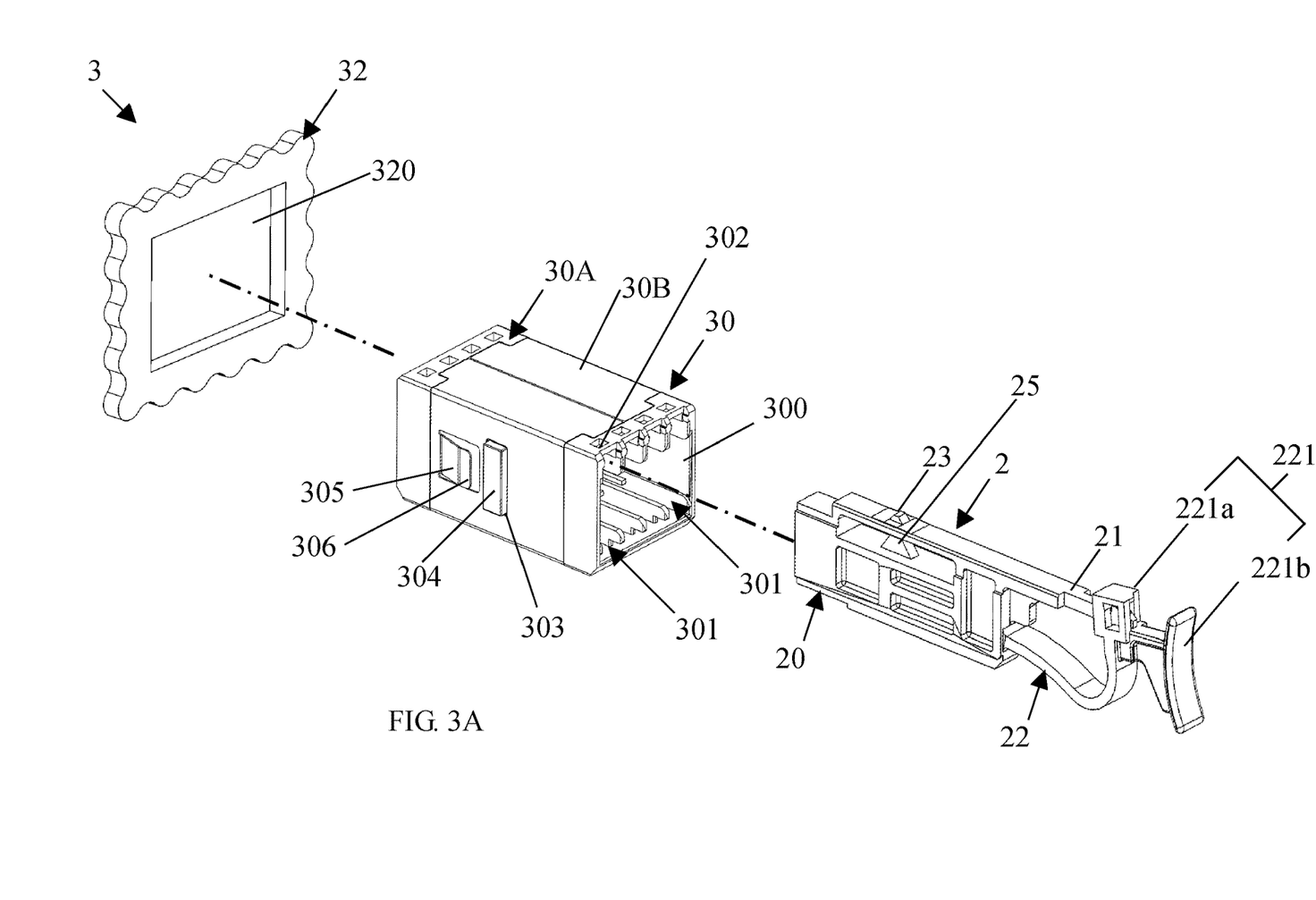
FIG. 3A is a three-dimensional exploded schematic diagram of an embodiment of the optical connector module in the present invention.
Figure 3B:
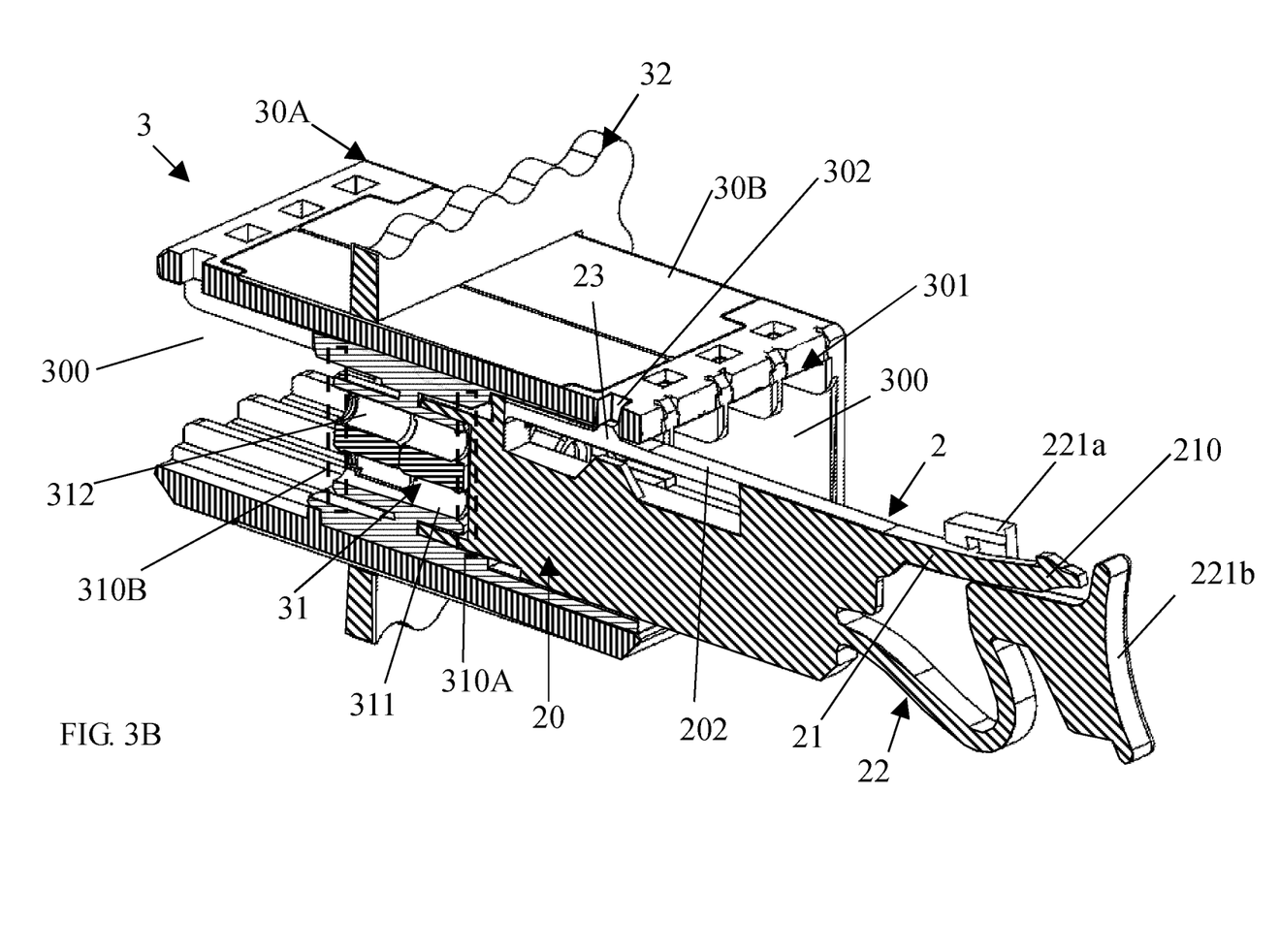
FIG. 3B is a cross-sectional schematic diagram of the optical connector module in the present invention.

Please refer to FIGS. 3A and 3B, in which FIG. 3A is a three-dimensional exploded schematic diagram of an embodiment of the optical connector module in the present invention, and FIG. 3B is a cross-sectional schematic diagram of the optical connector module in the present invention. In this embodiment, the optical connector module 3 includes an optical receptacle 30 and at least one dust-proof device 2. The both ends of the optical receptacle 30 has openings 300, and a plurality of insertion slots 301 are disposed in the optical receptacle 30. In this embodiment, the optical receptacle 30 has four insertion slots 301. The optical receptacle 30 further has a receptacle body 30A and a housing 30B sleeved on the periphery of the receptacle body 30A. The housing 30B is a metal casing formed by concavely folding a metal plate in this embodiment. The housing 30B has a first coupling structure 303, and a position corresponding to the first coupling structure 303 on the receptacle body 30A is a second coupling structure 304. In this embodiment, the first coupling structure 303 is an opening, and the second coupling structure 304 is a convex block, but it is not limited thereto. The housing 30B further has a leaning structure 305, which extends outwardly and obliquely from the surface of the housing 30B in a predetermined angle, and a leaning member 306 is disposed on an end of the housing 30B. When the entire optical receptacle 30 is installed on the apparatus, a shell 32 on the apparatus has a corresponding through hole 320 to allow the optical receptacle 30 to insert, and the leaning member 306 is leaned against the shell 32 after the optical receptacle 30 is inserted. Eventually, the positioning effect is produced.

Each insertion slot 301 in the receptacle body 30A corresponds to the coupling base 31, the first side 310A of each coupling base 31 has a first insertion interface 311, and the second side 310B of each coupling base 31 has a second insertion interface 312. Each of the first insertion interface 311 or the second insertion interface 312 may be electrically connected to the optical connector. When it is not electrically connected to the optical connector, in order to avoid contamination, each of the first insertion interface 311 or the second insertion interface 312 may be connected to the dust-proof device 2. In the embodiment shown in FIGS. 3A and 3B, the dust-proof device 2 is connected to the first insertion interface 311. In this embodiment, when the dust-proof device 2 is connected to the first insertion interface 311, the positioning structure 23 is embedded into the corresponding first buckle structure 302 on the receptacle body 30A, so that the dust-proof device 2 may be more firmly fixed into the optical receptacle 30. Since the positioning structure 23 is arranged on the beam structure 202 that may be flexibly deformed, when the combination between the positioning structure 23 and the first buckle structure 302 is to be released, a force is to be applied to the beam structure 202 to make it deform, and the positioning structure 23 is separated from the first buckle structure 302. It should be noted that, in order to prevent the beam structure 202 from being deformed or broken due to excessive stress, in this embodiment, a supporting structure 25 is further disposed in the hollow area 201, the supporting structure 25 supports the beam structure 202 when the beam structure 202 is deformed. The supporting structure 25 has a supporting effect and prevents the beam structure 202 from being deformed or broken.

Figure 3C:
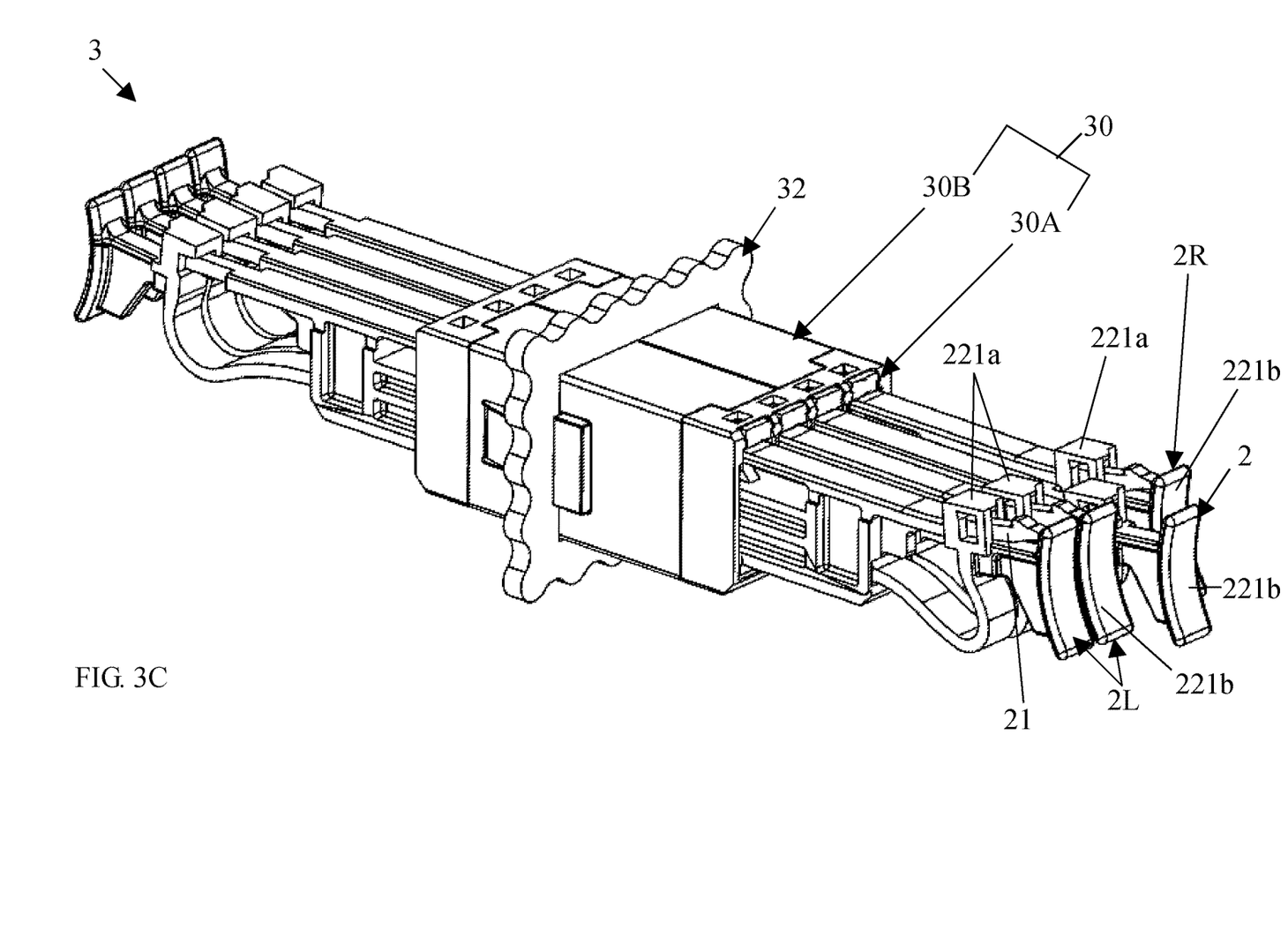
FIG. 3C is a schematic diagram of the optical connector module in use state in the present invention.

Next, the method of taking away the dust-proof device 2 from the optical receptacle 30 is going to be explained. As shown in FIG. 3B, due to the high-density arrangement of the coupling base 31 of the optical receptacle 30, when the dust-proof device is fully inserted, how to easily take away the dust-proof device at a predetermined position is a main point. Through the structural design of the dust-proof device in the present invention, the user may conveniently take away the dust-proof device in a predetermined position. As shown in FIG. 3C, if the user wants to take away the dust-proof device 2, the thumb and index finger of one hand can be used to pull it out. When pulling it out, the user's thumb pushes against the pressing plate 221b of the dust-proof devices 2L, which are on the left of the dust-proof device 2, and the index finger pushes against the pressing plate 221b of the dust-proof device 2R, which is on the right of the dust-proof device 2. It should be noted that although the thumb and the index finger are used in this embodiment, the thumb and the index finger are not limited in actual operation. Due to pressing the pressing plate 221b, the sliding sleeves 221a of the dust-proof devices 2L and 2R would be driven to slide along the fixing arm 21 toward the optical receptacle 30, so that operation spaces are generated on both sides of the dust-proof device 2. At this time, the user's thumb and index finger may conveniently grasp the pressing plate 221b of the dust-proof device 2, and the optical dust protector 2 is then pulled out.

It should be noted that, in the process of pulling out the dust-proof device 2, as shown in FIG. 3B, due to the design of inclined surfaces on both sides of the positioning structure 23, the positioning structure 23 is in contact with the first buckle structure 302 of the corresponding positioning structure 23 on the receptacle body 30A. During the pulling process, the first buckle structure 302 applies an action force on the positioning structure 23, and then transmits the action force to the beam structure 202, so that the beam structure 202 is flexibly deformed downwards, and the positioning structure 23 is detached from the first buckle structure 302 during the process of pulling the dust-proof device 2. As a result, the user may smoothly pull out the dust-proof device 2 from the optical receptacle 30.

Figure 4A:
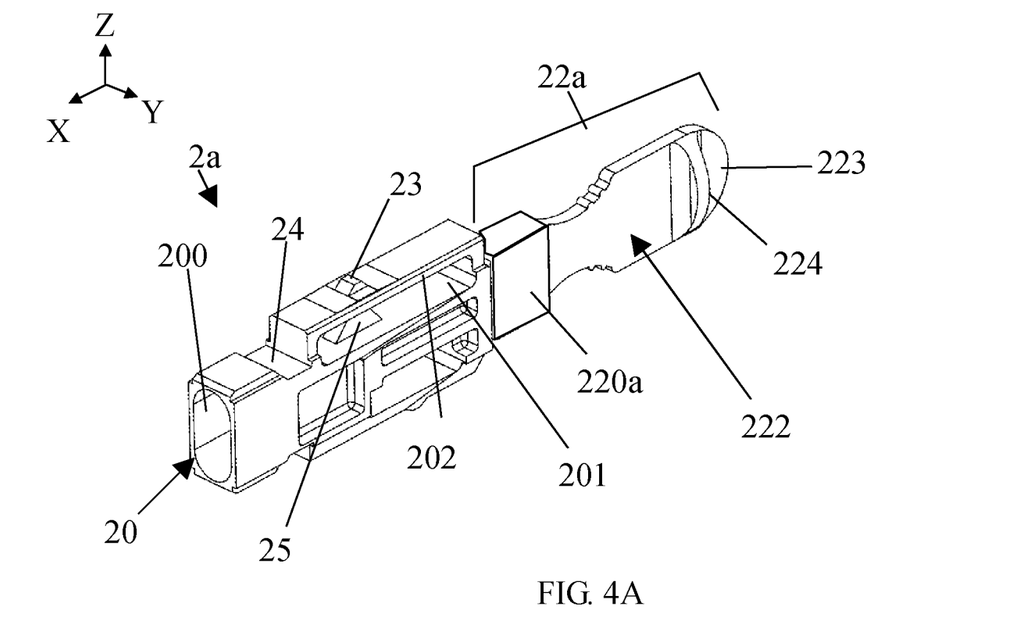
FIGS. 4A and 4B are respectively a three-dimensional and top-view schematic diagrams of another embodiment of the dust-proof device in the present invention.
Figure 4B:
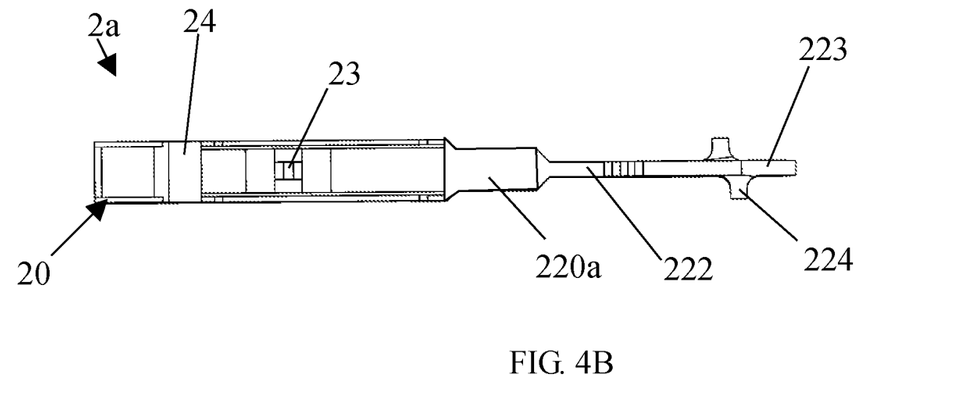

Please refer to FIGS. 4A and 4B, which are respectively a three-dimensional and top-view schematic diagrams of another embodiment of the dust-proof device in the present invention. The dust-proof device 2a in this embodiment is similar to the previous embodiment. The difference is that in the previous embodiment, as shown in FIG. 2C, the X-axis is used as the axis to scroll by the flexible arm. In this embodiment, the Z-axis is taken as the axis, and the flexible arm swings left and right. The coupling portion 20 of the dust-proof device 2a has buckle grooves 24 on the upper and lower sides respectively, the function of which would be described later. An end of the coupling portion 20 has a flexible arm 22a, which has a connecting portion 220a and a swing structure 222. The connecting portion 220a is connected with the coupling portion 20, and the swing structure 222 is connected with the connecting portion 220a. The swing structure 222 may swing left and right with the Z-axis as the axis by an action force. Wherein the free end of the swing structure 222 has a grab handle 223, and a stopping plate 224 is extended on both sides thereof. In this embodiment, the stopping plates 224 on both sides of the grab handle 223 are staggered.

Figure 5A:
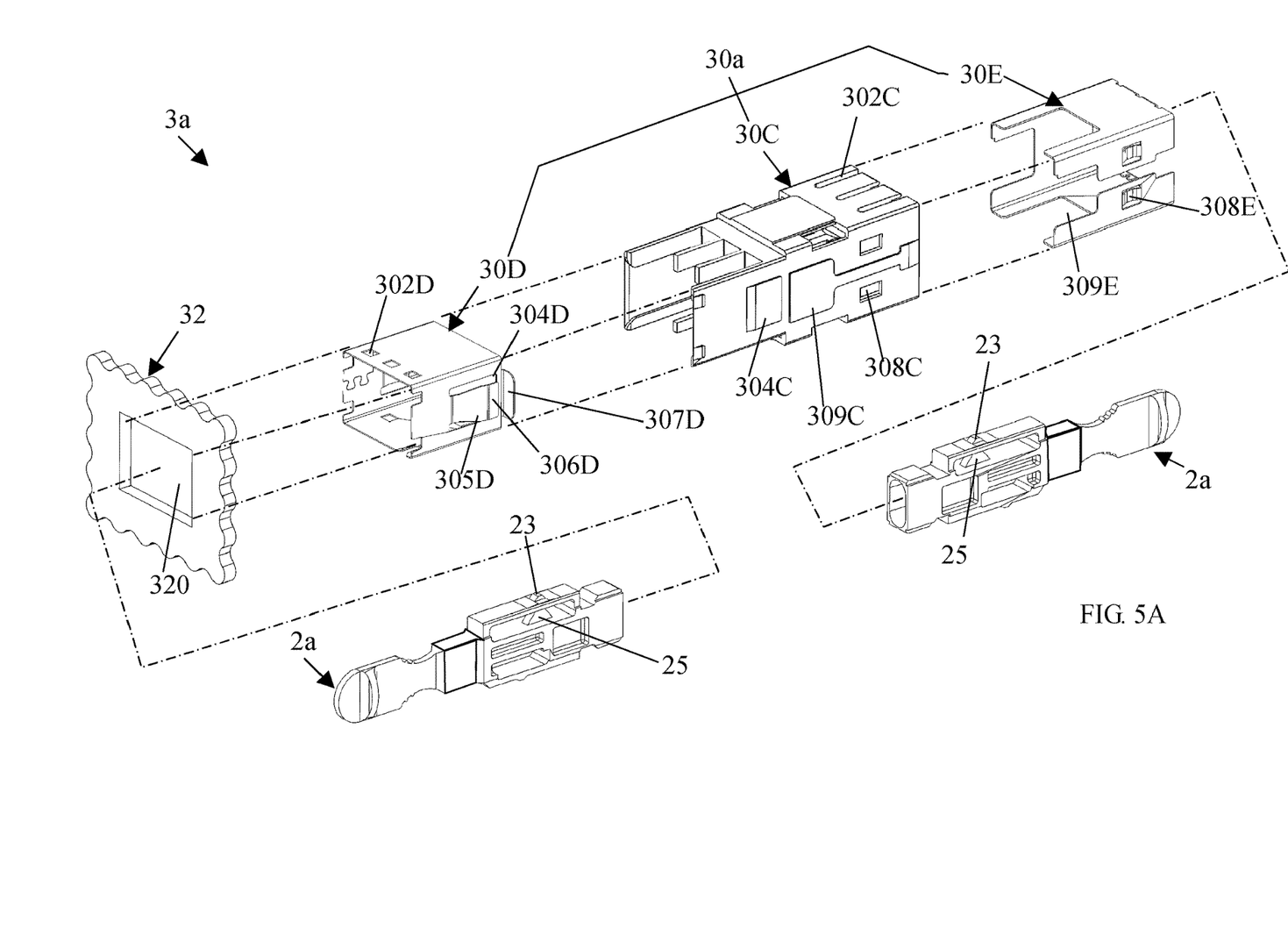
FIGS. 5A and 5B are respectively a three-dimensional exploded and partial cross-sectional schematic diagram of another embodiment of the optical connector module in the present invention.
Figure 5B:
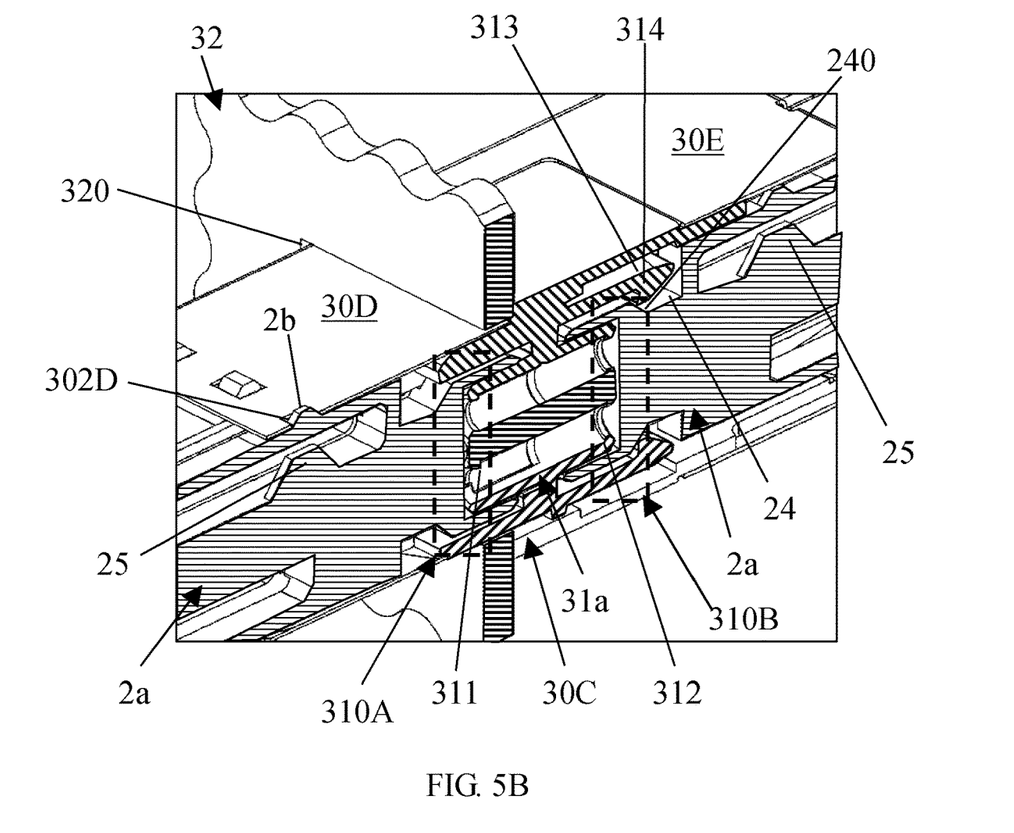

Please refer to FIGS. 5A and 5B, which are respectively a three-dimensional exploded and partial cross-sectional schematic diagram of another embodiment of the optical connector module in the present invention. In this embodiment, the optical connector module 3a includes an optical receptacle 30a and a plurality of dust-proof devices 2a. The optical receptacle 30a includes a receptacle body 30C, a first housing 30D, and a second housing 30E. The first housing 30D and the second housing 30E are made by bending a metal plate. The receptacle body 30C has a coupling base 31a, the number of which depends on how many optical connectors are inserted into each receptacle body 30C. Since the receptacle body 30C of this embodiment may be inserted by three optical connectors or three dust-proof devices, there are three coupling bases 31a. Each coupling base 31a has a first insertion interface 311 and a second insertion interface 312 on the first side 310A and the second side 310B, respectively. The first insertion interface 311 and the second insertion interface 312 are used for coupling with the optical connector. When not coupled to the optical connector, the first insertion interface 311 and the second insertion interface 312 may be coupled with the dust-proof device 2a in this embodiment. The dust-proof device 2a prevents the coupling base 31a from being contaminated.

In addition, both sides of the first housing 30D have a third coupling structure 304D and abutting structure 305D, wherein the leaning structure 305D is extended outwardly and obliquely from the surface of the first housing 30D in a predetermined angle, and an end of the leaning structure 305D has the leaning member 306D. There is a baffle plate 307D corresponding to the leaning member 306D at an end of the first housing 30D. The part on the receptacle body 30C corresponding to the third coupling structure 304D of the first housing 30D is the fourth coupling structure 304C, which is combined with the third coupling structure 304D. In this embodiment, the third coupling structure 304D is a through hole, and the fourth coupling structure 304C is a convex block combined with the through hole. When the entire optical receptacle 30a is installed on the apparatus, a shell 32 on the apparatus has a corresponding through hole 320 to allow the optical receptacle 30a to insert, the baffle plate 307D is leaned against the shell 32, and the leaning member 306 is leaned against the shell 32 after the optical receptacle 30 is inserted. Eventually, the positioning effect is produced. The first housing 30D further has a first buckle structure 302D. When the dust-proof device 2a is inserted into the optical receptacle 30a to be coupled to the first insertion interface 311 of the first side 310A, it is combined with the positioning structure 23 on the dust-proof device 2a, so that the dust-proof device 2a is firmly combined with the coupling base 31a.

The second housing 30E has a fifth coupling structure 308E and a fixing groove 309E. The second housing 30E is sleeved on the outer surface of the receptacle body 30C on the side of the second insertion interface 312. The receptacle body 30C has a sixth coupling structure 308C at a position corresponding to the fifth coupling structure 308E of the second housing 30E, and the sixth coupling structure 308C is used to be combined with the fifth coupling structure 308E. In this embodiment, the fifth coupling structure 308E is a convex plate, and the sixth coupling structure 308C is a concave plate that fits with the convex plate. In addition, the receptacle body 30C also has a seventh coupling structure 309C, which is combined with the corresponding fixing groove 309E when the second housing 30E is combined with the socket body 30C, so that the second housing 30E may be firmly combined with the receptacle body 30C. In this embodiment, the coupling base 31a further has a pair of parallel rods 313 on the second side 310B, and one of the rods 313 has a second buckle structure 314. When the corresponding dust-proof device 2a is inserted into the receptacle body 30C, the second buckle structure 314 is combined with the buckle groove 24 on the coupling portion 31a to ensure that the dust-proof device 2a is firmly inserted into the receptacle body 30C. It should be noted that although in this embodiment, the parallel rod 313 and the second buckle structure 314 are located on the second side 310B, in another embodiment, the parallel rod 313 and the second buckle structure 314 may also be located on the first side 310A, or be located on both the first side 310A and the second side 310B. It should be noted that the receptacle body 30C has a positioning groove 302C corresponding to the second insertion interface 312, which corresponds to the positioning structure 23 of the dust-proof device 2a. When the dust-proof device 2a is inserted into the receptacle body 30C, the positioning structure 23 on the dust-proof device 2a may be inserted into the corresponding positioning groove 302C to produce a fixing effect.

Figure 6:
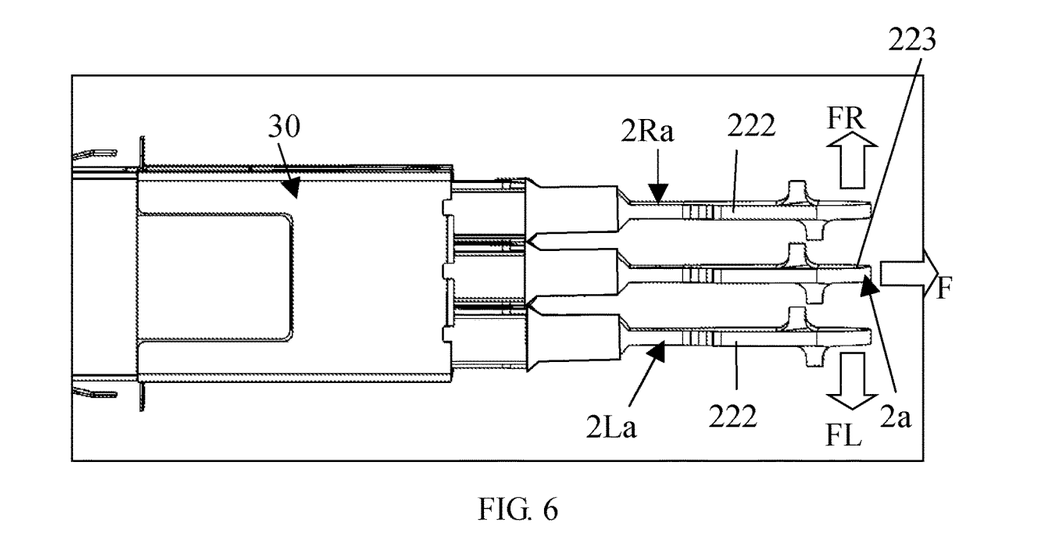
FIG. 6 is a top-view schematic diagram of an embodiment with a plurality of dust-proof devices inserted into the optical receptacle in the present invention.

Next, the function of the dust-proof device shown in FIG. 5A is going to be explained. As shown in FIG. 6, which is a top-view schematic diagram of an embodiment with a plurality of dust-proof devices inserted into the optical receptacle in the present invention. It can be seen in FIG. 6 that since the stopping plates 224 are staggered, the adjacent swing structures 222 would not be interfered by the stopping plates 224. When the user wants to take the dust-proof device 2a away in the middle, taking the operation of the user's thumb and index finger as an example, when the thumb and index finger hold the grab handle 223 at the end of the swing structure 222 of the dust-proof device 2a in the middle, the thumb and index finger have action forces FL and FR respectively applied to the swing structure 222 of the dust-proof device 2La and 2Ra on both sides of the dust-proof device 2a. Since the swing structure 222 is flexible, the swing structures 222 of the dust-proof devices 2La and 2Ra swing in the FL direction and the FR direction, respectively, so as to free an operation space to accommodate the user's thumb and index finger. At this time, the user may pull the dust-proof device 2a out of the optical receptacle 30a by applying the pulling force F. During the pulling process, as shown in FIG. 5B, the guiding surface 240 where the buckle groove 24 contacts the second buckle structure 314 is an inclined surface. Therefore, when the dust-proof device 2a is pulled, the guiding surface 240 may follow the pulling force to separate with the second buckle structure 314. Returning to FIG. 6, after the optical dust-proof device 2a is pulled out, since the swing structure 222 of the optical dust-proof devices 2La and 2Ra is flexible, the dust-proof device 2La and 2Ra immediately return to their original positions by accumulated flexible force.

In summary, the present invention provides the dust-proof device and the optical connector module thereof, through the flexible and swingable handle structure, allows the user to pull out the target dust-proof device, the adjacent dust-proof device may be deformed to generate the operation space for the user to pull out the target dust-proof device. After the target dust-proof device is pulled out, the adjacent dust-proof device may be returned to the original position by the flexible restoring force, the effect of solving the conventional technology is achieved.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A dust-proof device, for protecting an insertion interface of an optical receptacle, comprising:
    a coupling portion, having a positioning structure disposed on a side of the coupling portion; and
    a flexible arm, an end of the flexible arm connected to the coupling portion, wherein the flexible arm swings or scrolls at a connecting portion where the coupling portion is connected to the flexible arm,
    wherein the coupling portion has a hollow area, a beam structure is disposed above the hollow area, and a supporting structure is disposed in the hollow area, and one end of the supporting structure is fixed with the beam structure to support the beam structure and prevent the beam structure from being broken when the beam structure is deformed,
    wherein the optical receptacle has a coupling base, and the coupling portion is inserted into the coupling base to prevent the coupling base from being contaminated in the optical receptacle,
    wherein the coupling portion has a notch, which allows the coupling base to insert and is disposed at an opposite side of the flexible arm.

2. The dust-proof device of claim 1, further comprising a fixing arm connected to the coupling portion, wherein the flexible arm has a sliding portion slidably disposed on the fixing arm.

3. The dust-proof device of claim 2, wherein a stopping structure is disposed on an end of the fixing arm.

4. The dust-proof device of claim 2, wherein the sliding portion comprises:
   a sliding sleeve, slidably disposed on the fixing arm; and
   a pressing plate, connected to the sliding sleeve,
   wherein a position of the pressing plate is changed as the sliding sleeve slides.

5. The dust-proof device of claim 1, wherein the flexible arm has the connecting portion and a swing structure, the connecting portion is connected to the coupling portion, the swing structure is connected to the connecting portion, and the swing structure is swung by an action force.

6. The dust-proof device of claim 5, wherein a grab handle is disposed on a free end of the swing structure, and a stopping plate is disposed on two sides of the grab handle.

7. The dust-proof device of claim 6, wherein the stopping plates disposed on two sides of the grab handle are staggered.

8. The dust-proof device of claim 5, wherein a buckle groove is disposed on two sides of the coupling portion.

9. The dust-proof device of claim 1, wherein a positioning structure is disposed on the beam structure.

10. An optical connector module, comprising:
    an optical receptacle, having a plurality of coupling bases, a first insertion interface disposed on a first side of the each coupling base, and a second insertion interface disposed on a second side of the each coupling base; and
    a plurality of dust-proof devices, inserted into the optical receptacle through the first insertion interface or the second insertion interface and coupled to the corresponding coupling base, the each dust-proof device having a coupling portion and a flexible arm, the coupling portion coupled to the coupling base, a positioning structure disposed on a side of the coupling portion, and an end of the flexible arm connected to the coupling portion,
    wherein the flexible arm swings or scrolls at a connecting portion where the coupling portion is connected to the flexible arm to generate an operation space to the adjacent dust-proof device.

11. The optical connector module of claim 10, further comprising a fixing arm connected to the coupling portion, wherein the flexible arm has a sliding portion slidably disposed in the fixing arm.

12. The optical connector module of claim 11, wherein a stopping structure is disposed on an end of the fixing arm.

13. The optical connector module of claim 10, wherein the sliding portion comprises:
    a sliding sleeve, slidably disposed on the fixing arm; and
    a pressing plate, connected to the sliding sleeve,
    wherein a position of the pressing plate is changed as the sliding sleeve slides.

14. The optical connector module of claim 10, wherein the optical receptacle has a housing, which has a first buckle structure corresponding to the each first insertion interface or the each second insertion interface, and the first buckle structure combines with the positioning structure when the corresponding dust-proof device is inserted into the optical receptacle.

15. The optical connector module of claim 10, wherein the optical receptacle has a receptacle body, a first housing, and a second housing, the first housing is disposed on an outer surface of the receptacle body corresponding to the first insertion interface, the second housing is disposed on the other outer surface of the receptacle body corresponding to the second insertion interface, and the first housing has a first buckle structure corresponding to the positioning structure.

16. The optical connector module of claim 10, wherein the coupling base has a parallel rods, one of the rods has a second buckle structure, which is combined with a buckle groove on the coupling portion when the corresponding dust-proof device is inserted into the optical receptacle.

17. The optical connector module of claim 10, wherein the flexible arm has the connecting portion and a swing structure, the connecting portion is connected to the coupling portion, the swing structure is connected to the connecting portion, and the swing structure is swung by an action force.

18. The optical connector module of claim 17, wherein a grab handle is disposed on a free end of the swing structure, and a stopping plate is disposed on two sides of the grab handle.

19. The optical connector module of claim 10, wherein the stopping plates disposed on two sides of the grab handle are staggered.

20. The optical connector module of claim 19, wherein the coupling portion has a hollow area, a beam structure is disposed above the hollow area, and a positioning structure is disposed on the beam structure.

21. The optical connector module of claim 20, wherein the hollow area has a supporting structure for supporting the beam structure when the beam structure is deformed.

* * * * *